US007726422B2

(12) United States Patent
Sun et al.

(10) Patent No.: US 7,726,422 B2
(45) Date of Patent: Jun. 1, 2010

(54) SPHERICAL WALKING ROBOT

(75) Inventors: Hanxu Sun, Beijing (CN); Qingxuan Jia, Beijing (CN)

(73) Assignee: Beijing University of Posts & Telecommunications, Beijing (CN)

( * ) Notice: Subject to any disclaimer, the term of this patent is extended or adjusted under 35 U.S.C. 154(b) by 777 days.

(21) Appl. No.: 11/675,128

(22) Filed: Feb. 15, 2007

(65) Prior Publication Data

US 2007/0215394 A1 Sep. 20, 2007

(30) Foreign Application Priority Data

Mar. 15, 2006 (CN) .......................... 200610057465

(51) Int. Cl.
B62D 57/02 (2006.01)
B25J 17/00 (2006.01)
(52) U.S. Cl. .................. 180/7.1; 180/8.1; 180/212; 180/21; 180/210; 901/1; 318/568.12; 446/486; 446/456; 74/490.01
(58) Field of Classification Search .................. 180/7.1, 180/212, 21, 210, 8.1; 901/1; 318/568.12; 446/486, 456; 74/490.01
See application file for complete search history.

(56) References Cited

U.S. PATENT DOCUMENTS

| 2,267,254 A * | 12/1941 | Reilley ........................ 180/21 |
| 3,746,117 A * | 7/1973 | Alred ........................... 180/21 |
| 4,501,569 A * | 2/1985 | Clark et al. .................. 446/458 |
| 4,729,446 A * | 3/1988 | Sefton ......................... 180/21 |
| 4,878,393 A * | 11/1989 | Duta et al. ............... 74/490.06 |
| 6,289,263 B1 * | 9/2001 | Mukherjee .................. 700/245 |
| 6,378,634 B1 * | 4/2002 | Yim ......................... 180/7.1 |
| 6,414,457 B1 * | 7/2002 | Agrawal et al. ......... 318/568.12 |
| 6,896,078 B2 * | 5/2005 | Wakui ........................ 180/7.1 |
| 7,013,200 B2 * | 3/2006 | Wakui ....................... 700/245 |
| 7,165,637 B2 * | 1/2007 | Tanielian .................... 180/7.1 |
| 2002/0036104 A1 * | 3/2002 | Kerrebrock et al. .......... 180/6.2 |
| 2004/0192163 A1 * | 9/2004 | Siegel ........................ 446/486 |
| 2007/0144798 A1 * | 6/2007 | Tanielian .................... 180/7.1 |
| 2008/0097644 A1 * | 4/2008 | Kaznov et al. .............. 700/245 |
| 2009/0099709 A1 * | 4/2009 | Troy ............................ 701/1 |

\* cited by examiner

*Primary Examiner*—Lesley Morris
*Assistant Examiner*—Marlon A Arce
(74) *Attorney, Agent, or Firm*—Ladas & Parry LLP

(57) ABSTRACT

The embodiments of the present invention disclose a spherical walking robot, the spherical walking robot comprises a spherical coronal; a spherical housing which has a surface groove; a walking and transmission mechanism in the spherical housing; a lift and transmission mechanism; mechanical arms located in the surface groove, and the mechanical arm comprises a little arm and an upper arm connected the little arm by an elbow joint motor. The embodiments of the present invention also disclose a spherical walking robot, the spherical walking robot does not comprise the lift and transmission mechanism, but a fastness mechanism and a rotating mechanism rotatably connected with the fastness mechanism.

19 Claims, 4 Drawing Sheets

SPHERICAL WALKING ROBOT

FIELD OF THE INVENTION

The present invention generally relates to a robot, and particularly relates to a spherical walking robot.

BACKGROUND OF THE INVENTION

A spherical walking robot has been developed in recent years. At present, some spherical walking robots with different structures are invented. Generally, the spherical walking robot contacts the ground with points which results in pure rolling friction with little resistance, and the spherical walking robot is flexible and convenient to be driven and turned around, and can be driven to walk in all directions and turned around with zero turning radius, so the spherical walking robot can walk in all directions on 2-dimensional ground and easily pass through flexuous channel whose caliber is a little larger than the diameter of the spherical walking robot. Besides the spherical walking robot is highly adaptive to various road conditions, so it is expected to become an ideal delivery vehicle moving on rough ground in the future, however application of the spherical walking robot is still restricted to a great extent in some special circumstances.

Besides the spherical walking robot, multiplied robot or robot with mechanical arms also has attracted wide attentions, researches and applications so far. The multiplied robots or robot with mechanical arms is highly adaptive to surroundings; the mechanical arms can perform various functions like the arms of human beings, and can do many special jobs. But the multiplied robots or robot with mechanical arms is not characterized in omni-directional walk in two dimensions and zero-radius turning around just like a spherical robot, which limits flexibility of the multiplied robot or robot with mechanical arms in many occasions. So the multiplied robot or robot with mechanical arms requires a good moving carrier for using in some circumstances.

SUMMARY OF THE INVENTION

Accordingly, embodiments of the present invention provide two spherical walking robots in order to overcome the limitations of the traditional spherical robots lacking arms, and overcome the limitations of the multiplied robot or robot with mechanical arms whose agility in movement is limited, and extend the application scope of robots.

A spherical walking robot includes: a spherical coronal; a spherical housing which has a surface groove and is opposite to the spherical coronal; a walking and transmission mechanism in the spherical housing; a lift and transmission mechanism connected with the spherical coronal and the spherical housing respectively, and the spherical coronal is operative to move close to the spherical housing to close up the spherical walking robot and is operative to move away from the spherical housing; mechanical arms located in the surface groove, and the mechanical arm includes a little arm and an upper arm connected with the little arm by an elbow joint motor, the upper arm is immovably fixed on the spherical coronal, and when the spherical coronal departs from the spherical housing, one end of little arm away from the elbow joint motor rotates around the elbow joint motor and the little arm extends out of the spherical housing.

A spherical walking robot includes: a spherical coronal; a spherical housing which has a surface groove and is opposite to the spherical coronal; a walking and transmission mechanism in the spherical housing; a fastness mechanism connected with the spherical coronal and the spherical housing respectively, and the fastness mechanism makes the spherical coronal away from the spherical housing, and forms a gap between the spherical coronal and the spherical housing; a rotating mechanism rotatably connected with the fastness mechanism, and configured in the surface groove of the spherical housing; mechanical arms located in the surface groove, and the mechanical arm includes a little arm and an upper arm connected with the little arm by an elbow joint motor, the upper arm is immovably fixed on the rotating mechanism and driven by the rotating mechanism, and one end of little arm away from the elbow joint motor rotates around the elbow joint motor and the little arm extends out of the spherical housing.

As seen from the above technical schemes, by fixing retractable arms on the spherical walking robot, the spherical walking robot can move around agilely when it retracts its mechanical arms, and can be used as a mechanical hand or a mechanical foot or other sensors when it extends out its mechanical arms, so that many specific operations can be performed by the spherical walking robot. In this way, the spherical walking robot according to the embodiment of the present invention has a moving characteristic and an operational characteristic, and extends the application scope of the traditional robot greatly.

BRIEF DESCRIPTION OF THE DRAWINGS

The embodiment of the present invention will be described in detail according to the following drawings hereinafter in order to make the characteristics and advantages of the present invention more apparent.

EMBODIMENTS OF THE INVENTION

The embodiments of the present invention are further described in detail according to the following drawings hereinafter in order to make the technical scheme of the present invention more apparent.

Figure 1:
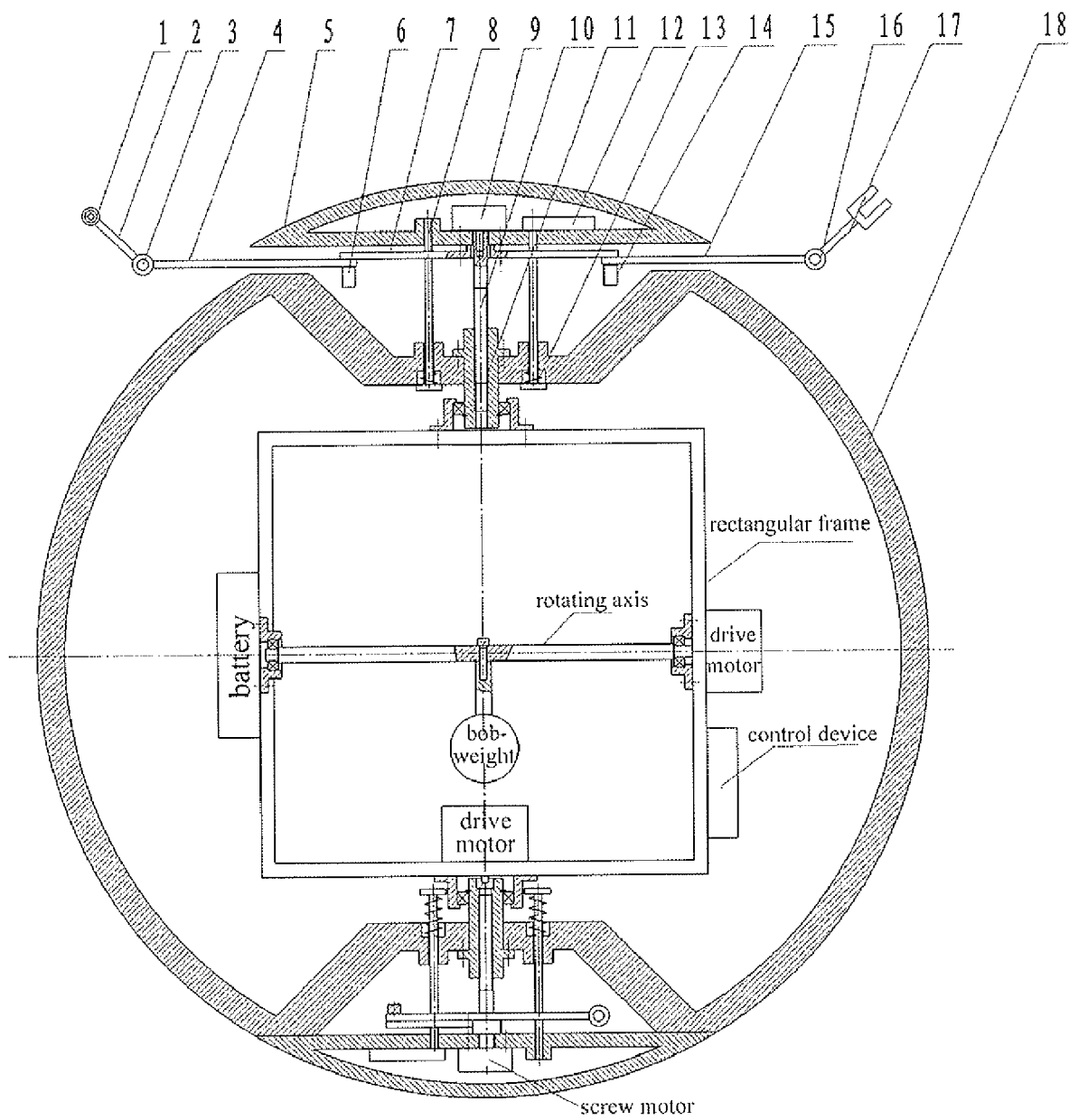
FIG. 1 is a schematic illustrating the overall structure of a spherical walking robot in accordance with a first embodiment of the present invention, and the spherical walking robot has a liftable spherical coronal and retractable mechanical arms, on one side of the spherical walking robot, two mechanical arms are extended out, and on the other side of the spherical walking robot, two mechanical arms are retracted.
Figure 2:
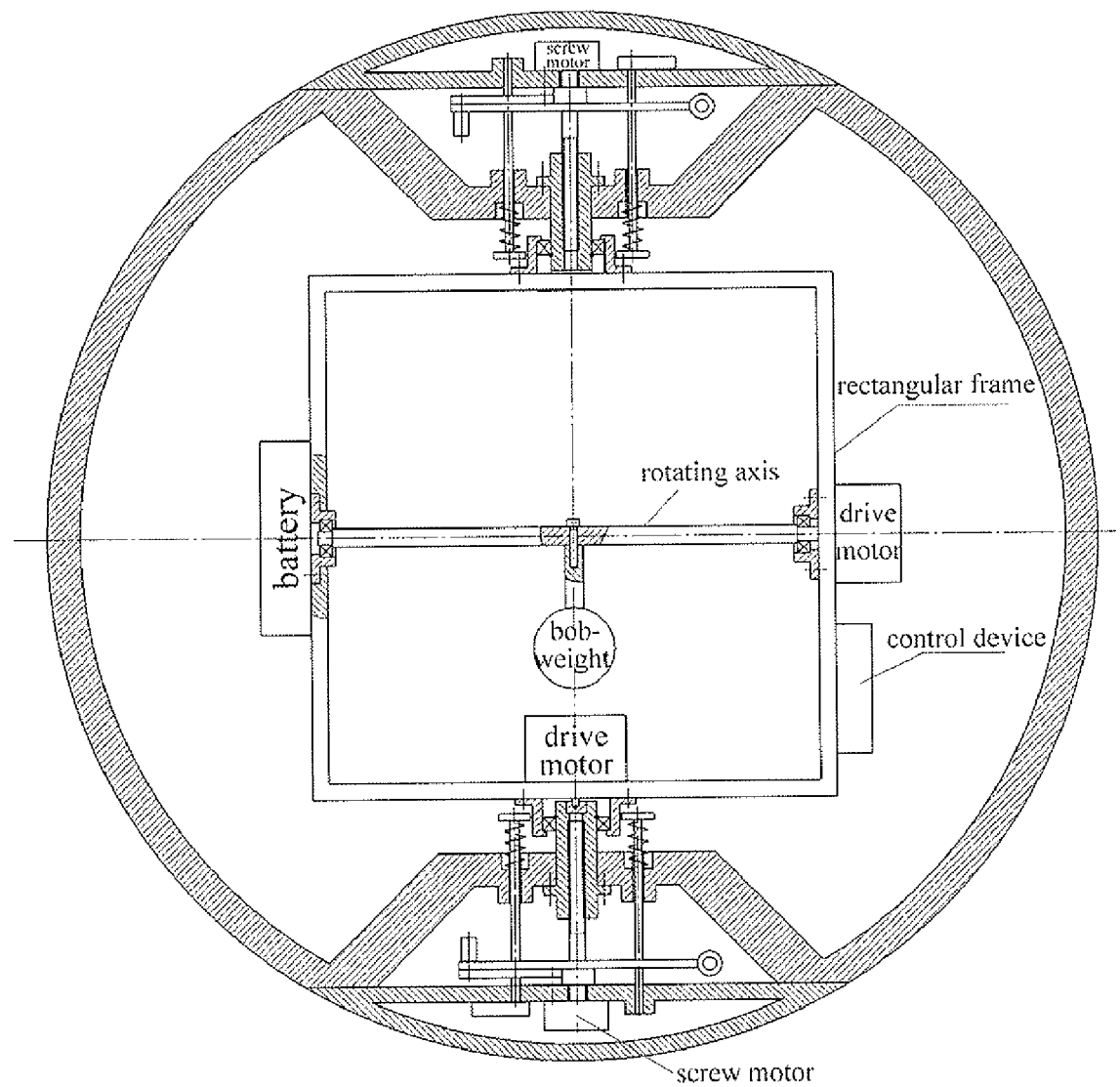
FIG. 2 is a schematic illustrating the overall configuration of the spherical walking robot as shown in FIG. 1 when the retractable mechanical arms are all retracted.

Referring to FIG. 1 and FIG. 2, the first embodiment of the present invention is shown in the two figures which have mechanical arms installed symmetrically on both sides of the spherical walking robot. In fact, more mechanical arms can be installed according to the need. In FIG. 1, there are a Charge Coupled Device (CCD) camera 1, mechanical hands 2 and 17, wrist motors 3 and 16, little arms 4 and 15, a spherical coronal 5, elbow joint motors 6 and 14, an upper arm 7, a guided rod 8, a screw motor 9, a screw 10, a screw sleeve 11, a control device 12, a pressed spring 13 and a spherical housing 18 opposite to spherical coronal 5 and spherical housing 18 has a surface groove. Little arms 4 and upper arm 7 are an example of a mechanical arm, and the mechanical arm located in the surface groove comprises a little arm 4 and a upper arm 7 connected with little arm 4 by an elbow joint motor, upper arm 7 is immovably fixed on spherical coronal 5, and when spherical coronal 5 departs from spherical housing 18, the end of little arm 4 away from the elbow joint motor rotates around the elbow joint motor and little arm 4 extends out of spherical housing 18. As shown in FIG. 1 and FIG. 2, screw motor 9, screw 10 and screw sleeve 11 composes an example of a lift and transmission mechanism, the lift and transmission mechanism is connected with spherical coronal 5 and spherical housing 18 respectively, and spherical coronal 5 can move close to spherical housing 18 to close up the spherical walking robot and can move away from spherical housing 18. And screw sleeve 11 is immovably fixed in the surface groove of spherical housing 18 and meshes with one end of screw 10; screw motor 9 is configured in the center of the internal space above a pedestal of spherical coronal 5; the other end of screw 10 is connected with an axis of rotation of screw motor 9 by a shaft coupling, and screw 10 rotates by the drive of screw motor 9; upper arm 7 is immovably fixed on spherical coronal 5. There are four guided rods 8 (referred to FIG. 4 for the locations thereof) averagely distributed around external side of screw 10 between spherical coronal 5 and spherical housing 18, and one end of the guided rod is fixed on spherical coronal 5, the other end of the guided rod extending through a positioning hole of spherical housing 18 has a guard and is configured with a pressed spring 13. Along with the rising and dropping of spherical coronal 5, guided rods 8 move along the axis of the spherical housing 18, and pressed spring 13 attached to the end of guided rods 8 can produce a pull force to enhance the stability of the spherical walking robot when spherical coronal 5 is rising or dropping or the mechanical arms are moving. With the drive of screw motor 9, screw 10 can make spherical coronal 5 move close to spherical housing 18 to close up the spherical walking robot and can make spherical coronal 5 move away from spherical housing 18. The length of upper arm 7 is greater than a distance between screw 10 and guided rods 8, so that there is space for the little arms 4 and 15 to rotate freely. As shown in FIG. 1 and FIG. 2, a rectangular frame and a rotating axis and a bobweight and a battery and a drive motor and a control device and so on in the spherical housing form an example of a walking and transmission mechanism. In this embodiment, a rectangular frame is used to support the drive motor and the control device and battery etc. of the walking and transmission mechanism.

If there is a need to extend the mechanical arms, firstly screw motor 9 rotates, and then spherical coronal 5 moves relatively away from the spherical housing 18 under the effect of the screw 10. At this moment, elbow joint motors 6 and 14 begin to rotate and drives the little arms 4 and 15 and the mechanical hands 2 and 17 to move, then the spherical robot is opened, and then the wrist motor 3 or 16 drives the mechanical hands and sensors or arm clamp fasteners thereon to move, which eventually extends the mechanical arm out of the spherical robot, and makes various operations possible. After the mechanical arms retract, spherical housing 18 and the spherical coronal 5 combine to form a complete sphere, enabling the spherical walking robot to walk omnidirectionally without limitation to the walking function thereof. The motion of the mechanical arms is implemented via control circuits of control device 12 controlling the lift and transmission mechanism and each of joint motors and mechanical hands and sensors, and the control circuits of control device 12 receive control information from a user via a wireless communication or a Bluetooth device. And control device 12 is configured in internal space above the pedestal of the spherical coronal.

It can be seen from FIG. 1 and FIG. 2 that in the structure of liftable spherical coronal which can be opened and closed, the mechanical arms on both sides may be extended simultaneously, or the mechanical arms on one side may be extended while those on the other side may be retracted. The mechanical arms on the two sides can be along a horizontal axis or along a vertical axis. The mechanical arms along the horizontal axis (referring to FIG. 1) can be extended out of the spherical housing on both sides at the same time to assist the movement of the spherical walking robot as feet or hands. When the mechanical arms are along the vertical axis, the mechanical arm at the bottom can be extended out of the spherical housing to implement ground locating, while the mechanical arm at the top can still be extended out to implement various operations.

Figure 3:
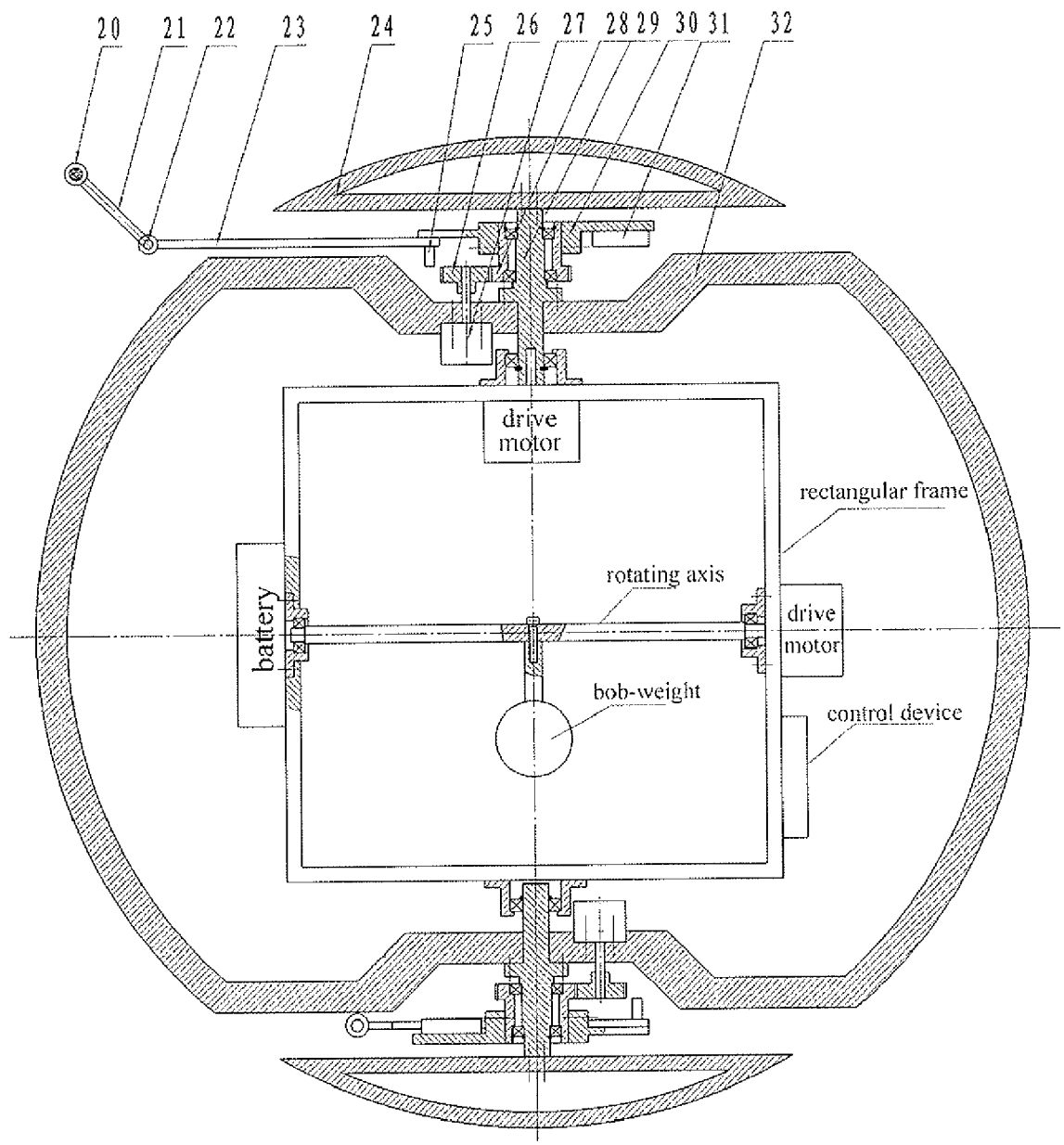
FIG. 3 is a schematic illustrating the overall structure of a spherical walking robot in accordance with a second embodiment of the present invention, and the spherical walking robot has an non-liftable spherical coronal and retractable arms, on one side of the spherical walking robot, one mechanical arm is extended out.

Referring to FIG. 3 which shows the overall structure of the spherical walking robot with retractable arms and non-liftable spherical coronal in accordance with the second embodiment of the present invention, there are a CCD camera 20, a mechanical hand 21, a wrist motor 22, a little arm 23, a spherical coronal 24, an elbow joint motor 25, a transmission gear 26, an upper arm drive motor 27, a rotating sleeve 28. In FIG. 3, there are a centre locating rod 29 and an upper arm 30 and a control device 31 and spherical housing 32, and centre locating rod 29 is an example of a fastness mechanism, this fastness mechanism is connected with spherical coronal 24 and spherical housing 32 respectively, and makes spherical coronal 24 away from spherical housing 32, and forms a gap between spherical coronal 24 and spherical housing 32, and spherical housing 32 opposites to spherical coronal 24 and has a surface groove. Transmission gear 26, upper arm drive motor 27, rotating sleeve 28 forms an example of a rotating mechanism, and the rotating mechanism is configured in the surface groove of spherical housing 32. One end of centre locating rod 29, i.e. the fastness mechanism, is fixed on spherical coronal 24, and the other end is fixed on surface groove of spherical housing 32 under spherical coronal 24, and centre locating rod 29, i.e. the fastness mechanism, is rotatably connected with the rotating mechanism via bearings.

Different from the first embodiment of the present invention, the second embodiment of the present invention does not comprise an open-close configuration, and uses the centre locating rod 29 instead of a screw of the first embodiment, and the centre locating rod 29 is used to connect spherical coronal 24 and spherical housing 32 to form a whole spherical walking robot. One end of upper arm 30 is immovably fixed on rotating sleeve 28 which rotates around the spherical walking robot, and rotating sleeve 28 is immovably fixed by two bearings on external side of centre locating rod 29, and an outer gear wheel of rotating sleeve 28 meshes with transmission gear 26 on the axis of rotation of upper arm drive motor 27 fixed in the surface groove of spherical housing 32, so rotating sleeve 28 and upper arm 30 fixed on rotating sleeve 28 are rotated under the driving of upper arm drive motor 27, then upper arm 30 and the whole mechanical arm rotate around centre locating rod 29.

In this way, the mechanical hand on the end of little arm 23 away from the elbow joint motor, and CCD camera 20 or other sensors carried by the mechanical hand can be kept uplifted by controlling upper arm drive motor 27 when the spherical walking robot rolls in the horizontal direction to implement detection and movement simultaneously as shown in FIG. 3. As shown in FIG. 3, a rectangular frame and a rotating axis and a bob-weight and a battery and a drive motor and a control device and so on in the spherical housing form an example of a walking and transmission mechanism. In this embodiment, a rectangular frame is used to support the drive motor and the control device and battery etc. of the walking and transmission mechanism.

Besides, only one mechanical arm whose control device 31 is located on the extending end of the other side of upper arm 30 is shown in FIG. 3, while in fact, two or more mechanical arms can be set in FIG. 3 with the control device thereof configured on the upper arm 30 of each of the mechanical arms respectively. Upper arm 30 and little arm 23 form an example of the mechanical arm, the mechanical arm is configured in the gap between spherical coronal 24 and spherical housing 32; and little arm 23 and upper arm 30 are connected by an elbow joint motor, upper arm 30 is immovably fixed on the rotating mechanism, and is rotated under the driving of the rotating mechanism; the end of little arm 23 away from the elbow joint motor rotates around the elbow joint motor and little arm 23 extends out of spherical housing 32. The motion of the mechanical arms is implemented via control circuits of control device 31 controlling the rotating mechanism and each of joint motors and mechanical hands and sensors, and the control circuits of control device 31 receive control information from a user via a wireless communication or a Bluetooth device.

It can be seen in FIG. 3 that the different portions of the spherical walking robot remain in the same location of the spherical surface with a gap between them, and the mechanical arms can be extended out and retracted into the gap. Compared with the first embodiment of the present invention, the second embodiment has the advantage of being simple in structure design and capable of moving in all directions with the arms extended, but the spherical walking robot in accordance with the second embodiment is half-baked because of the gap between the spherical coronal and the spherical housing.

Figure 4:
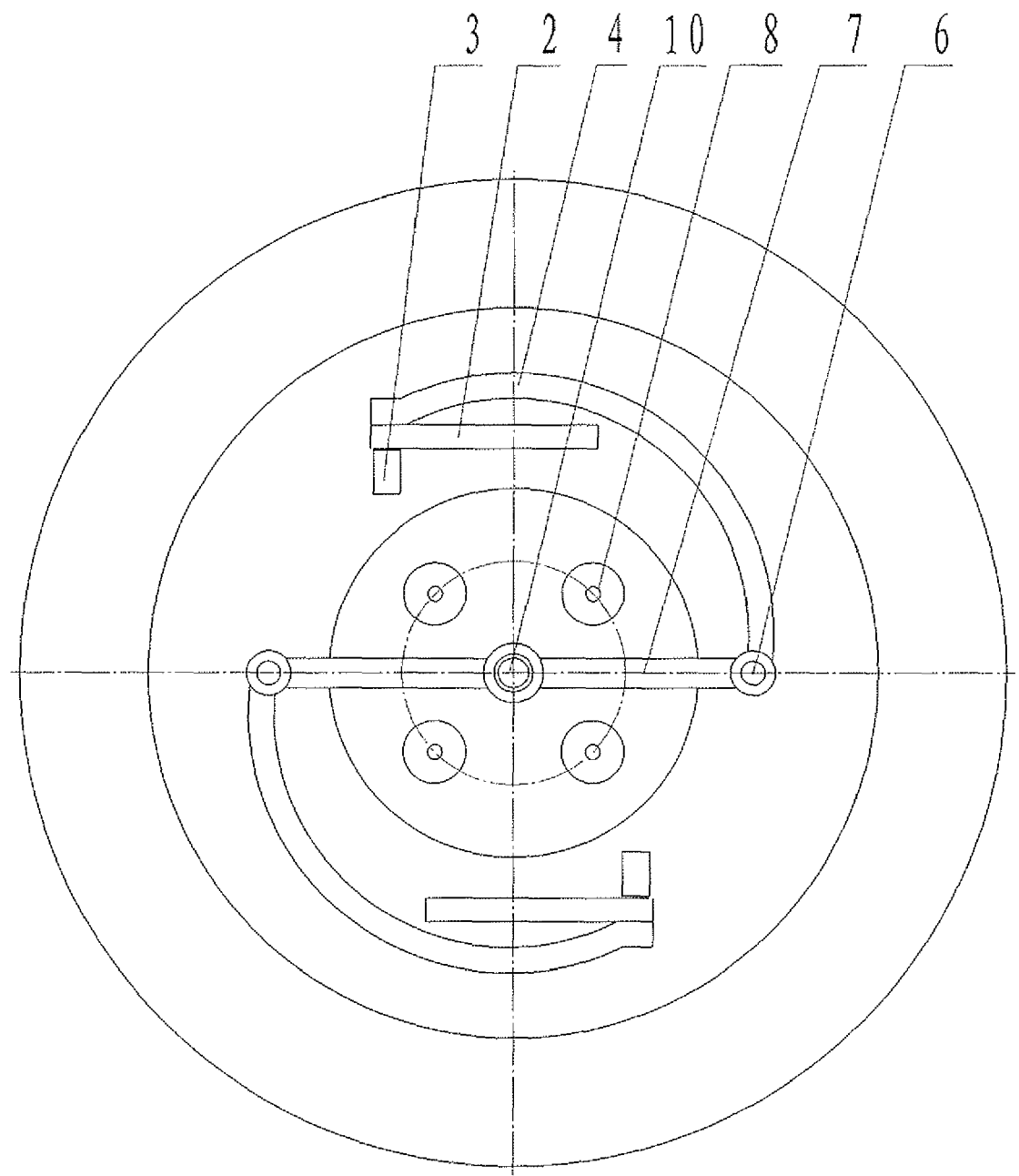
FIG. 4 is a schematic illustrating the top view of the installation of the mechanical arms and the joint motors thereof in the spherical walking robot with retractable arms in accordance with embodiment of the present invention.

As shown in FIG. 4, in accordance with embodiments of the present invention, the upper arm and little arm of the mechanical arms may both be made in the form of straight rod or in the form of arc bent rod according to the requirement for the space. And one arm or several arms can be installed within the spherical housing.

The spherical walking robot with retractable mechanical arms in accordance with the embodiment of the present invention, can not only keep the advantage of moving agilely in two dimensions, but also make the movement more agile and convenient because of the installation of the mechanical arms which can be used as mechanical feet and mechanical hands. For example, the spherical walking robot with retractable mechanical arms in accordance with the embodiment of the present invention can climb stairs and cross obstacles easily with the assistance of the mechanical arms. The enlargement of the movement area has extended the application scope of the spherical walking robot without doubt, which makes it possible to use the spherical walking robot in many special occasions, such as rescue in fire fighting, and removal of explosives in anti-terrorism tasks.

Furthermore, since the retractable mechanical arms can keep the spherical walking robot stable when the spherical walking robot is motionless, and can do diversified jobs as human hands when the retractable mechanical arms are extended, the spherical walking robot of the embodiment of the present invention can perform some dangerous and complicated tasks for human. For example, such a spherical robot may be sent deep into no man's land to make geological exploration, or used in military operations where it can cross obstacles set by enemy and go deep into enemy camps to conduct reconnaissance with the camera fixed on the end of the arms. In battlefields, the robot may have guns fixed on its arms to replace soldiers to fight against enemies so as to avoid casualty. It can be predicted that the spherical walking robot with retractable arms in accordance with the embodiment of the present invention will be used widely in the future in various occasions, such as emergency rescue, fire fighting, disaster relief, geological exploration, military operations, and so on.

The foregoing description is only preferred embodiments of this invention and is not for use in limiting the protection scope thereof. All the modifications, equivalent replacements or improvements in the scope of the sprit and principles of the present invention shall be included in the protection scope of the present invention.

What is claimed is:

1. A spherical walking robot, comprising:
   a spherical coronal;
   a spherical housing which has a surface groove and is opposite to the spherical coronal;
   a walking and transmission mechanism in the spherical housing;
   a lift and transmission mechanism connected with the spherical coronal and the spherical housing respectively, wherein the spherical coronal is operative to move close to the spherical housing to close up the spherical walking robot and is operative to move away from the spherical housing;
   mechanical arms located in the surface groove, wherein the mechanical arm comprises a little arm and an upper arm connected with the little arm by an elbow joint motor, the upper arm is immovably fixed on the spherical coronal, and when the spherical coronal departs from the spherical housing, one end of little arm away from the elbow joint motor is operative to rotate around the elbow joint motor and the little arm is operative to extend out of the spherical housing.

2. The spherical walking robot of claim 1, wherein the lift and transmission mechanism comprises a screw motor, a screw and a screw sleeve, in order to lift and drop the spherical coronal, and make the spherical coronal move close to the spherical housing and move away from the spherical housing, the screw motor is configured in a center of the internal space above a pedestal of the spherical coronal; one end of the screw is connected with an axis of rotation of the screw motor, and the screw is operative to rotate under the drive of the screw motor; the screw sleeve is immovably fixed in the surface groove of the spherical housing and meshes with the other end of the screw.

3. The spherical walking robot of claim 2, wherein two or three or four guided rods surrounding external side of the screw are further averagely distributed between the spherical coronal and the spherical housing, and one end of the guided rod is fixed on the spherical coronal, the other end of the guided rod extending through a positioning hole of the spherical housing has a guard and is configured with a pressed spring to improve the stability in lifting and dropping the spherical coronal and the stability of the motion of the mechanical arms.

4. The spherical walking robot of claim 3, wherein the length of the tipper arm is greater than a distance between the screw and the guided rods, so that there is a space for the little arm to rotate freely.

5. The spherical walking robot of claim 1, wherein at least one of the little arm and the upper arm is an arc bent rod.

6. The spherical walking robot of claim 1, wherein the walking and transmission mechanism comprises a rectangular frame.

7. The spherical walking robot of claim 1, wherein the end of little arm away from the elbow joint motor is further fixed with a mechanical hand.

8. The spherical walking robot of claim 7, wherein the mechanical hand is further fixed with a sensor.

9. The spherical walking robot of claim 8, wherein a control device is configured in internal space above a pedestal of the spherical coronal, and the control device comprises control circuits for controlling the lift and transmission mechanism and each of joint motors and mechanical hands and sensors.

10. The spherical walking robot of claim 1, wherein the control circuits receive control information from a user via a wireless communication.

11. A spherical walking robot, comprising:
a spherical coronal;
a spherical housing which has a surface groove and is opposite to the spherical coronal;
a walking and transmission mechanism in the spherical housing;
a fastness mechanism connected with the spherical coronal and the spherical housing respectively, wherein the fastness mechanism makes the spherical coronal away from the spherical housing, and forms a gap between the spherical coronal and the spherical housing;
a rotating mechanism rotatably connected with the fastness mechanism, and configured in the surface groove of the spherical housing;
mechanical arms located in the surface groove, wherein the mechanical arm comprises a little arm and an upper arm connected with the little arm by an elbow joint motor, the upper arm is immovably fixed on the rotating mechanism and driven by the rotating mechanism, and one end of little arm away from the elbow joint motor is operative to rotate around the elbow joint motor and the little arm is operative to extend out of the spherical housing.

12. The spherical walking robot of claim 11, wherein the fastness mechanism comprises a centre locating rod, and one end of the centre locating rod is fixed on the spherical coronal, and the other end is fixed on the surface groove of the spherical housing under the spherical coronal, and the centre locating rod is rotatably connected with the rotating mechanism via bearings.

13. The spherical walking robot of claim 12, wherein the rotating mechanism comprises a transmission gear, an upper arm drive motor and a rotating sleeve, and the rotating sleeve is immovably fixed by bearings on external side of the centre locating rod, and an outer gear wheel of the rotating sleeve is operative to mesh with the transmission gear on the axis of rotation of the upper arm drive motor fixed in the surface groove of the spherical housing, the rotating sleeve and the upper arm fixed on the rotating sleeve are rotated under the driving of the upper arm drive motor.

14. The spherical walking robot of claim 11, wherein at least one of the little arm and the upper arm is an arc bent rod.

15. The spherical walking robot of claim 11, wherein the walking and transmission mechanism comprises a rectangular frame.

16. The spherical walking robot of claim 11, wherein the end of little arm away from the elbow joint motor is further fixed with a mechanical hand.

17. The spherical walking robot of claim 16, wherein the mechanical hand is further fixed with a sensor.

18. The spherical walking robot of claim 17, wherein a control device is fixed on the upper arm, and the control device comprises control circuits for controlling the rotating mechanism and each of joint motors and mechanical hands and sensors.

19. The spherical walking robot of claim 18, wherein the control circuits receive control information from a user via a wireless communication.

* * * * *